Patented Aug. 4, 1936

2,049,447

UNITED STATES PATENT OFFICE 2,049,447

CONDENSATION PRODUCTS AND PROCESS FOR PREPARING SAME

Herbert Hönel, Klosterneuburg-Weidling, near Vienna, Austria, assignor to Beck, Koller & Company, Inc., Detroit, Mich., a corporation of Delaware No Drawing. Application May 4, 1932, Serial No. 609,337. In Austria August 6, 1927

15 Claims. (Cl. 260—4)

This invention relates to an improvement in condensation products of the phenol formaldehyde type and the process of making the same. The present application is a continuation in part of my application Serial No. 506,297, filed January 2, 1931, entitled Process for the production of condensation products, which is a division of my application Serial No. 218,587, filed September 9, 1927, entitled Condensation product and process for preparing same, now Patent Number 1,800,295, granted April 14, 1931, and also contains subject matter in common with my application Serial No. 362,460, filed May 11, 1929, entitled Artificial mass and process for making same, now Patent No. 1,800,296, granted April 14, 1931.

According to my Patent No. 1,800,295, I have ascertained, that by condensing together aldehydes and phenols substituted in the para position by a higher saturated hydrocarbon radicle, resinous products can be obtained, which are completely and readily soluble in petroleum hydrocarbons and possess highly valuable properties.

The substituents may be aliphatic or hydro-aromatic radicles, as e. g. the p-tertiary-butyl- or the p-tertiary-amyl- or the p-cyclohexyl-group, which can be easily introduced by means of different methods.

Now I have found a way which is particularly suitable for the production of heat hardening solid resinous condensation products from para-tertiary-butylphenol and a considerable excess of formaldehyde over the equimolecular proportion. These resins yield, by reacting them under heat with drying oils (preferably China wood oil), very excellent bases for varnish manufacture which are superior to those prepared from liquid or crystalline condensation products and drying oils.

First I prepare a condensation product in the same way as described in my Patent No. 1,800,295 above referred to. This process comprises leaving in contact the phenol body and aqueous commercial formaldehyde solution and such a quantity of a strong alkali so that a clear solution of the constituents occurs. The temperature may be the ordinary one or moderately elevated. After the formaldehyde has been bound which takes between 1 to 10 days according to the temperature and the proportion of formaldehyde employed, I precipitate the condensation product from its alkaline solution by neutralizing the latter with any substance of acidic character. Elevated temperature may be used in this process in order to obtain a well settled condensation product. In order to obtain a pale resin which will also yield pale and clear products when reacted under elevated temperature conditions with drying oils and the like, an effort should be made to secure an exact neutralization of the alkaline catalyst. The aqueous phase is separated from the condensation product and the latter may optionally be washed by repeatedly mixing same thoroughly with water and separating the two layers. The condensation product, depending upon the temperature employed and upon the length of time respectively, will be of a thin liquid nature or more or less viscous or even solid at ordinary room temperature. In the latter cases, elevated temperatures must be used any way for precipitating and neutralizing the condensation product or washing the same.

Now I heat the condensation product slowly up to temperatures of about 120–150° C. until I obtain a clear solid resin of any desired degree of hardness or any desired melting point. The mechanically adhering as well as the chemically formed water escapes the reaction mass due to the heat treatment and the continued condensation reaction. In case the condensation product is already a solid mass at ordinary room temperature as explained above, the employment of a vacuum is advisable, as otherwise an undesirable high stage of condensation may occur before the water has evaporated. Naturally the moist solid condensation product can also be pulverized and dried in the simplest way. Hereupon it can be used as such, or can be melted into a clear resin which may be kept at an elevated temperature if a still higher stage of condensation is desired.

According to my opinion the originally formed mixture of the butyl-phenol-mono- and dialcohol, which represents a low viscous oil, forms, both after being precipitated and when still being in alkaline aqueous solution, phenol alcohols of higher molecular polynuclear phenols which have more or less resinous properties.

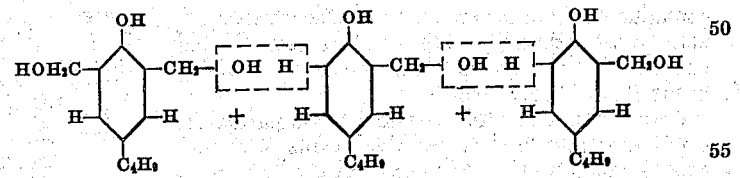

1 molecule dialcohol + 2 molecules monoalcohol etc.

On account of their $CH_2OH$ groups such compounds can undergo further condensations, mostly under splitting off of water forming higher melting resins and finally eventually insoluble and infusible brown masses.

The method of producing the comparatively low molecular condensation product may also be modified by employing a smaller amount of alkali not sufficient to cause a clear one-phase-solution of the butyl-phenol in the aqueous formaldehyde. In this case I add some alcohol until I obtain a clear mutual solution of all the ingredients; or I take care that the aqueous phase, which contains free formaldehyde, gets in a constant touch with the other phase (which contains the phenol, phenolate and partly formed condensation product) by a continuous thorough mixing of the two phases.

Similar resins also can be prepared by starting the condensation of the phenol body with formaldehyde in the presence of a strong acidic catalyst until a viscous condensation product has been formed and then by continuing the condensation in an alkaline medium, in a manner similar to that described in the above paragraph.

In the acidic medium the formation of various higher molecular polynuclear phenols may occur, whilst in the succeeding alkaline medium the entrance of CH₂OH groups may occur. The final condensation product will be of a similar structure as the formula shown above indicates; and it really behaves in the same way as the resins which are obtained by employing the alkaline medium from the beginning.

However, the simplest and preferred method, as described above, is to work only in an alkaline medium and in such a manner that a condensation product is obtained which is still in the liquid stage at ordinary room temperature, and to thereafter transform the liquid condensation product into a solid resin by heating the same.

Finally it should be mentioned, that instead of using chemically pure butyl-phenol, technically crude products can be used which are obtained according to the known methods. Such products usually contain small amounts of ortho-butyl-phenol and di-(ortho-para-) butyl-phenol as byproducts where the para-butyl-phenol is the main constituent.

The solid reactive condensation product of the soluble stage obtained by any of the described methods can be worked up together with a suitable amount of drying oils and other materials commonly employed in varnish manufacture in the same way as the lower molecular oily or viscous products themselves from which they are derived. The reaction of the latter with drying oils etc. has been described in my copending earlier applications to which I referred above. But the solid products yield by reacting them with the oils etc. still more highly valuable bases for varnishes than the liquid ones do. I believe that the CH₂OH groups of the resin which causes the continued condensation undergo also certain reactions with the drying oils when heated together in a similar manner as I have already explained in my Patent No. 1,800,296.

Combination products, even of comparatively small amounts of the reactive resins with oils show a much higher viscosity than the oils themselves. Such resins, which by prolonged heating finally become infusible, need a certain minimum of the oil, as otherwise the entire reacting mixture will yield a gelatinous mass which can only swell in solvents. This amount of oil depends upon the viscosity of the oil itself; the higher its viscosity, the higher its minimum amount.

In accordance with my earlier applications, the drying oils may be replaced wholly or partly by altered (e. g. heat treated) drying oils or by non-drying oils or other bases of the varnish manufacture. Such bases may be either ordinary or altered natural resins or artificial resins or compounds or mixtures of such resins with drying oils as e. g. mixed glycerol esters, the saponification of which yields polybasic acids and unaltered or altered fatty acids and occasionally natural resinous acids on the one hand and glycerol on the other. Such esters are not of a typically resinous nature, but are of relatively low viscosity, and are more or less oily. Suitable mixed glycerol esters of this kind have been described in my Patent No. 1,800,296.

By reacting all those mentioned products with the above described reactive resinous products from p-tertiary-butylphenol and formaldehyde in suitable proportions I have always obtained a very remarkable increase of their durability, toughness, resistance etc.

A small amount of such materials or their mixtures may optionally be present already during the above described formation of the solid products from the oily or viscous ones and may be a constituent of the final reactive solid product. Provided, a proper relative amount of formaldehyde has been employed, this mixing product nevertheless will become infusible when heated alone.

The following examples are only intended to illustrate the methods and it will be understood that the principles of my invention are neither limited to specific proportions given in the examples nor to the temperatures etc. employed.

*Example 1*

100 parts of p-tertiary-butylphenol and 85 parts of commercial 40 per cent. formaldehyde solution are left in contact in the presence of 15 parts of 40 per cent. caustic soda solution. Care must be taken, that the temperature does not rise above about 60° C. in order to avoid a considerable loss of formaldehyde. The phenol body soon dissolves and melts due to the reaction heat and forms a clear solution with the other ingredients. The alkaline solution is maintained at about 40° C. for one week and by neutralizing same with any acidic substance, the oily reaction product is precipitated. After separating the latter from the supernatant aqueous liquid, it is heated for about 2 hours at 100° C. and then higher up to about 135° C. and is kept at this temperature for about half-an-hour.

115 parts of a clear pale resin are obtained hereby, which is readily soluble in benzine and other hydrocarbons and many other solvents. It is also very easily soluble in drying oils. When heated alone for a prolonged time at about 150° C. it is converted into an infusible and insoluble dark brown condensation product.

When heated together with about 300 parts of China wood oil up to finally 230° C., I obtain about 405 parts of a pale, highly viscous combination product which represents a very valuable base for the varnish manufacture. This may be diluted with petroleum hydrocarbons in any proportion. After addition of a common drier, the thus obtained varnish dries extremely quickly to a smooth very tough and resistant film. The proportion of the China wood oil may be increased up to 800 parts or it may be substituted by about 600 parts of a moderately bodied oil and 200 parts of ester gum (rosin-glycerol ester) or of pale coumarone resin. In the latter cases I first melt the gum with the oil under stirring and then add the resinous condensation product.

Example 2

100 parts of the p-tertiary-butylphenol are heated in a container provided with a return condenser with 30 parts of commercial aqueous 30 per cent. formaldehyde solution and with 4 parts of concentrated hydrochloric acid, until the odor of the formaldehyde has disappeared. The water is separated from the highly viscous condensation product which partly contains the unaltered phenol body. Now this condensation product and 75 parts of aqueous 30 per cent. formaldehyde solution and 6 parts of 40 per cent. caustic soda solution are kept at a temperature of about 60 to 65° C. for about 30 hours under constant vigorous stirring. After neutralizing and settling of the highly viscous condensation product, it is treated in the same way as explained in Example 1. A temperature of about 120° C. is sufficient to produce a solid condensation product with the properties of the product of Example 1. When heated with oils and the like it behaves similarly.

For instance, I combine the product (1 part) with the viscous mixed glycerol ester prepared from 1 part of camphoric acid, ¾ parts of American wood rosin, ½ part of linseed oil fatty acids, ½ part of glycerol and 2 parts of China wood oil and ½ part of linseed oil, by heating the whole reactive mixture up to about 240° C. The final product represents a very tough slightly sticky mass, which is readily soluble in common solvents and can be used similarly to a common oil varnish, but which possesses extremely good qualities. The camphoric acid may be replaced by other polybasic acids or their anhydrides, as e. g. about ¾ parts of phthalic anhydride or phthalic acid or about ⅔ parts of adipic acid or about ⅓ part of maleic acid and so on.

Example 3

100 parts of a technical p-tertiary-butylphenol which contains 1 to 2 per cent. ortho-butylphenol and 5 to 10 per cent. di-tertiary-butylphenol (ortho-para) and occasionally 1 per cent. of meta-butylphenol as byproducts and 80 parts of commercial 40 per cent. formaldehyde solution and 10 parts of 40 per cent. caustic soda are heated to 60° C. for 3 days. Such an amount of alcohol is added as to form a clear mixture and additional amounts of alcohol are added whenever a separation into two layers occurs during the condensation. The condensation product is precipitated and carefully neutralized in the heat at about 80 to 90° C. by adding diluted hydrochloric acid and repeatedly washed with water. The main amount of alcohol is by this means removed. The moist condensation product solid at ordinary room temperature, is pulverized and left to dry. It represents a resin with a melting point of about 50° C. and can be worked up as such with drying oils and the like as explained in the foregoing examples or it is melted and heated to about 120° C. until a resin with a melting point of 80 to 90 C. is obtained, whereupon it can be employed for preparing varnishes and the like.

Both the lower melting resin and the higher melting resin can be worked up in the heat with an ester-like product which has been prepared as follows:

|  | Grams |
|---|---|
| Abietic acid | 100 |
| Castor oil fatty acid | 50 |
| Methyl - isopropyl-endoethylene-tetrahydrophthalic acid | 50 |
| Maleic acid | 20 |
| Glycerine | 50 | are heated at 200° C. under stirring until a uniform melt has been formed. Then 200 grams of castor oil are added gradually and the temperature is raised to 270° and kept until the acid number has dropped to 25 or below. The resulting product constitutes a highly viscous mass. 100 grams of one of the resins obtained above are dissolved in the mass at about 150° C. whereupon the temperature is raised to 230° C. or higher. A soft highly elastic resin is obtained which may be used as a plasticizer in nitrocellulose lacquers.

In the foregoing examples I have restricted myself to the use of ordinary pressure, but it is obvious that the employment of different pressures, particularly reduced pressures, also falls within the scope of my invention.

It will be understood that the disclosures of my prior Patents Nos. 1,800,295 and 1,800,296 are to be considered as part of the disclosure of the present specification.

My invention is broadly applicable to a very large number of ester-like substances, as has been disclosed in my prior Patent No. 1,800,296. The solid condensation products hereinbefore referred to may therefore be reacted equally well with any practically neutral ester-like body which is non-volatile.

What I claim is:

1. A process of preparing an oil soluble resin which is solid at ordinary temperature and capable of undergoing further condensation on the application of heat, from para-tertiary-butylphenol, which process comprises maintaining the phenol and a substantial excess of formaldehyde over the equimolecular quantity in contact for a prolonged period of time at moderate temperatures in the presence of a strong alkaline catalyst, whereupon the condensation product formed hereby is further condensed by the application of heat into a solid resin, the process including neutralizing the catalyst.

2. A process of preparing an oil soluble resin which is solid at ordinary temperature and capable of undergoing further condensation on the application of heat, from para-tertiary-butylphenol, which process comprises maintaining the phenol and a substantial excess of formaldehyde over the equimolecular quantity in contact for a prolonged period of time at moderate temperatures in the presence of a strong alkaline catalyst, whereby a quantity of formaldehyde corresponding with 1-2 mol. per each mol. or the phenol is compounded, whereupon the condensation product formed hereby is further condensed by the application of heat into a solid resin, the process including neutralizing the catalyst.

3. A process of preparing an oil soluble resin which is solid at ordinary temperature and capable of undergoing further condensation on the application of heat, from para-tertiary-butylphenol, which process comprises (1) maintaining the phenol and a substantial excess of formaldehyde over the equimolecular quantity in contact for a prolonged period of time at moderate temperatures in the presence of a strong alkaline catalyst, whereby a quantity of formaldehyde corresponding with 1-2 mol. per each mol. of the phenol is compounded, (2) neutralizing the alkaline catalyst by acidifying the reaction mixture and (3) converting the thus obtained liquid condensation product into a solid resin by the application of heat.

4. A process of preparing an oil soluble resin which is solid at ordinary temperature and capable of undergoing further condensation on the application of heat, from para-tertiary-butylphenol, which process comprises (1) maintaining the phenol and a substantial excess of formaldehyde over the equimolecular quantity in contact for a prolonged period of time at moderate temperatures in the presence of a strong alkaline catalyst, whereby a quantity of formaldehyde corresponding with 1-2 mol. per each mol. of the phenol is compounded, and (2) heating the reaction mixture at considerably elevated up to boiling temperatures for such a period of time that on neutralizing the reaction mixture a condensation product is precipitated which is solid at ordinary temperature.

5. A process according to claim 1, in which diminished pressure is employed in order to dry the condensation product.

6. A process according to claim 1, in which a homogenizing agent is added to the reaction mixture.

7. A modification of the process according to claim 1, which comprises starting the condensation of the phenol body with formaldehyde in the presence of an acidic catalyst until a viscous condensation product has been formed and continuing the condensation in an alkaline medium.

8. An oil soluble resin which is solid at ordinary temperature and capable of undergoing further condensation on the application of heat, obtained by maintaining para-tertiary-butylphenol and a substantial excess of formaldehyde over the equimolecular quantity in contact for a prolonged period of time at moderate temperatures in the presence of a strong alkaline catalyst, whereupon the condensation product formed hereby is further condensed by the application of heat into a solid resin, the process including neutralization of the catalyst.

9. An oil soluble resin which is solid at ordinary temperature and capable of undergoing further condensation on the application of heat, obtained by maintaining para-tertiary-butylphenol and a substantial excess of formaldehyde over the equimolecular quantity in contact for a prolonged period of time at moderate temperatures in the presence of a strong alkaline catalyst, whereupon the condensation product formed hereby is further condensed by the application of heat into a solid resin, the process including neutralization of the catalyst, said solid resin yielding homogeneous reaction products when heated together with a drying oil, which reaction products are soluble in common solvents if at least a certain minimum proportion of oil is employed, but gelatinous and insoluble if less than that minimum proportion is employed, said proportion being dependent on the viscosity of the oil employed.

10. An oil soluble resin which is solid at ordinary temperature and capable of undergoing further condensation on the application of heat, obtained by (1) maintaining para-tertiary-butylphenol and a substantial excess of formaldehyde over the equimolecular quantity in contact for a prolonged period of time at moderate temperatures in the presence of a strong alkaline catalyst, whereby a quantity of formaldehyde corresponding with 1-2 mol. per each mol. of the phenol is compounded, (2) neutralizing the catalyst by acidifying the reaction mixture and (3) converting the thus obtained liquid condensation product into a solid resin by the application of heat.

11. A process of dissolving the product obtained according to claim 1 in a fatty oil and causing the two components to react by application of heat, whereby further condensation occurs with the formation of water.

12. A homogeneous reaction product formed by reacting together by the application of heat the product obtained according to claim 1 and a fatty oil.

13. A homogeneous reaction product formed by reacting together by the application of heat the product obtained according to claim 1 and a drying oil.

14. A homogeneous reaction product formed by reacting together by the application of heat, the product obtained according to claim 1 and a bodied drying oil.

15. A homogeneous reaction product formed by reacting together below the polymerization temperature the product obtained according to claim 1 and a fatty oil, the reaction product obtained being distinguished by its substantially higher viscosity as compared with the mere mixture of the two components.

HERBERT HÖNEL.